United States Patent [19]
Haake et al.

[11] Patent Number: 6,035,084
[45] Date of Patent: Mar. 7, 2000

[54] FIBER OPTIC CONNECTOR AND ASSOCIATED METHOD FOR ESTABLISHING AN OPTICAL CONNECTION WITH AN OPTICAL FIBER EMBEDDED WITHIN A COMPOSITE STRUCTURE

[75] Inventors: John M. Haake, St. Charles; Matthew M. Thomas; Keith C. Schuette, both of St. Louis; James P Dunne, Valley Park, all of Mo.; Jack H. Jacobs, Glendale, Ariz.

[73] Assignee: McDonell Douglas Corporation, St. Louis, Mo.

[21] Appl. No.: 08/969,236

[22] Filed: Nov. 13, 1997

[51] Int. Cl.⁷ ..................................... G02B 6/30
[52] U.S. Cl. .............................. 385/49; 385/34; 385/131; 385/132
[58] Field of Search ................................ 385/49, 73, 74, 385/33, 34, 35, 53, 131, 132

[56] References Cited

U.S. PATENT DOCUMENTS 4,632,505 12/1986 Allsworth .............................. 350/96.21
5,793,916 8/1998 Dahringer et al. ......................... 385/95

OTHER PUBLICATIONS

Thomas et al., Manufacturing of Smart Structures Using Fiber Placement Manufacturing Process, *SPIE*, vol. 2447, Mar. 1995 pp. 266–273.

NSG America, Inc., *Selfoc Product Guide*, NSG America, Inc., Spring 1993.

*Primary Examiner*—Hung N. Ngo
*Attorney, Agent, or Firm*—Alston & Bird LLP

[57] ABSTRACT

A fiber optic connector for establishing an optical connection with an optical fiber embedded within a composite structure is provided. The fiber optic connector includes a first lens element, such as a metal sheathed graded index (GRIN) lens, that is attached to the portion of the edge surface of the composite structure to which the optical fiber extends. The fiber optic connector also includes an alignment tube and a second optical fiber, external to the composite structure, having an end portion disposed within one end of the alignment tube. By sliding the other end of the alignment tube over the first lens element, optical communication is established between the first optical fiber embedded within the composite structure and the second optical fiber external to the composite structure. The fiber optic connector also typically includes a ferrule mounted upon the end portion of the second optical fiber and inserted at least partially into one end of the alignment tube. In order to effectively couple the optical signals between the embedded optical fiber and the external optical fiber, the fiber optic connector also generally includes a second lens element, such as a second GRIN lens, disposed within a medial portion of the alignment tube for collimating the optical signals.

16 Claims, 3 Drawing Sheets

FIBER OPTIC CONNECTOR AND ASSOCIATED METHOD FOR ESTABLISHING AN OPTICAL CONNECTION WITH AN OPTICAL FIBER EMBEDDED WITHIN A COMPOSITE STRUCTURE

FIELD OF THE INVENTION

The present invention relates generally to fiber optic connection devices and associated methods and, more particularly, to fiber optic connection devices for establishing an optical connection with an optical fiber embedded within a composite structure.

BACKGROUND OF THE INVENTION

Composite structures are employed in an increasing number of applications, such as a variety of automotive and aviation applications. Regardless of the particular application, composite components can be formed by laying up or stacking a number of plies, such as on a tool or mandrel which, at least partially, defines the shape of the resulting composite structure. The plies are thereafter consolidated, such as by an autoclave process, into an integral laminate structure.

In addition to conventional autoclave processes, composite components can be fabricated by a fiber placement process in which plies of fibrous tow pre-impregnated with thermoset or thermoplastic resin, typically termed prepregs, are individually placed on and consolidated to an underlying composite structure. Preferably, a laser heats the lower surface of the fiber-placed ply and the upper surface of the underlying composite structure to at least partially melt a localized region of the ply. Compactive pressure is then applied to the at least partially molten region of the ply, such as by a roller disposed downstream of the laser, so as to consolidate the fiber-placed ply and the underlying composite structure, thereby forming the integral laminate structure. One advantage of a fiber placement process is that the composite material can be cured on the fly, thereby reducing the time required to fabricate a composite part.

Another method of fabricating composite components is a resin transfer molding (RTM) process. According to a RTM process, a number of fibers, such as graphite or glass fibers, are woven to form a woven fiber intermediate structure. For example, the fibers can be woven on a loom-type structure as known to those skilled in the art. Resin can then be introduced to the woven fiber intermediate structure such that, once the resin has cured, the resulting composite component formed from the resin-impregnated woven fiber structure is created.

Regardless of the fabrication method, composite components oftentimes include a number of optical fibers which extend through the composite component in order to form communication paths, for example. In addition, composite components, such as composite components which form the external surface of an aircraft, ship, helicopter or submarine, typically include fiber optic sensors for monitoring the temperature or strain to which the structure is subjected. Although the types of composite components that include optical fibers are not limited to smart structures, smart structures that include electrical devices, such as in antennas, electroceramic actuators and integrated circuits, oftentimes also include a network of optical fibers for establishing communication between the various electrical devices and one or more processors or controllers which monitor or control the electrical devices.

In order to receive signals originating from outside the composite component and to transmit signals outside of the composite component, the optical fibers are commonly routed to and extend through the surface or edge of the composite structure. In this regard, a composite structure generally includes inner and outer surfaces through which the optical fibers extend. Most commonly, the optical fibers are routed through the inner surface of the composite structure. However, the surface egress of the optical fibers is primarily effective in instances in which a hollow composite structure is fabricated, such as a cylindrical object, i.e., a submarine hull or a missile body, which permits the fiber optics to be routed to the hollow interior of the composite structure. In contrast, in instances in which the composite structure is not hollow, such as a solid or a relatively planar composite structure, the surface egress of the optical fibers is less effective since the optical fibers will protrude from a surface, such as the exterior surface, of the composite structure and may interfere with the performance of the structure or be vulnerable to being sheared off.

Even in instances in which the composite structure is hollow, the optical fibers must typically be extended into the hollow mandrel or tool upon which the composite structure is formed. As such, the mandrel must define an opening through which the optical fibers will extend. After placing the innermost layers or plies upon the hollow mandrel, a corresponding opening must be formed or drilled through the innermost layers and in alignment with the opening defined by the mandrel such that the optical fibers can be inserted through the opening in the mandrel and into the hollow interior. As will be apparent, the process of forming the opening in the innermost layers can be quite tedious and time consuming in order to properly align the opening in the innermost layer with the opening in the mandrel.

The optical fibers are then inserted into the interior of the hollow mandrel in a random order. Consequently, the optical fibers can become entangled with each other or with other surface-egressed components, such as electrical leads, to form a tangled web which is relatively difficult to disentangle. In addition, the process of disentangling the optical fibers may inadvertently shear off one or more of the optical fibers.

In order to make the necessary optical connections with the optical fibers extending from a composite component, the optical fibers must first be disentangled. As will be apparent, the disentanglement of the optical fibers is a time consuming and tedious process. The optical fibers are also fragile and susceptible to being broken during the manufacturing process and, thus, must be handled in a delicate manner, thereby further complicating the disentanglement procedure. In addition, the optical fibers must be stored or located in a manner which does not impede the mechanical connection of the composite components or the performance of the resulting structure. Therefore, even though the optical fibers extending from a number of individual composite components can be interconnected, conventional techniques suffer from a number of deficiencies, including the time consuming and tedious nature of the interconnections, as described above.

SUMMARY OF THE INVENTION

It is therefore an object of the present invention to provide a fiber optic connector and an associated method for establishing optical contact with an optical fiber embedded within a composite structure without requiring the optical fiber to extend through the surface or edge of the composite structure, thereby eliminating tangled optical fibers and the resulting time and difficulty associated with disentangling the optical fibers.

It is another object of the present invention to provide a fiber optic connector and an associated method for establishing optical contact with an optical fiber embedded within a composite structure in a manner that permits subsequent disconnection, if so desired.

These and other objects are provided, according to the present invention, by a fiber optic connector for establishing an optical connection with an optical fiber embedded within a composite structure, such as a multi-ply laminate structure. The fiber optic connector includes a first lens element, such as a metal sheathed graded index (GRIN) lens, that is attached to the portion of the edge surface of the composite structure to which the optical fiber extends.

The fiber optic connector also includes an alignment tube defining a bore extending lengthwise between first and second opposed ends and a second optical fiber, external to the composite structure, having an end portion disposed within the second end of the alignment tube. By sliding the first end of the alignment tube over the first lens element, optical communication is established between the first optical fiber embedded within the composite structure and the second optical fiber external to the composite structure.

The alignment tube forms a portion of a fiber optic connector assembly that also preferably includes a second lens element disposed within a medial portion of the bore of the alignment tube. The fiber optic connector assembly also preferably includes a ferrule defining a lengthwise extending bore for receiving an end portion of the second optical fiber. The ferrule is thereby at least partially inserted within the second end of the alignment tube. According to one advantageous embodiment, the fiber optic connector assembly also includes an inner tube in which the second lens element and at least a portion of the ferrule are disposed. The inner tube is, in turn, disposed within the bore of the alignment tube to further facilitate alignment of the end portion of the second optical fiber with the second lens element and, in turn, with the first lens element and the first optical fiber. Once the alignment tube has been slid over the first lens element, optical signals can be efficiently coupled between the first optical fiber embedded within the composite structure and the second optical fiber external to the composite structure via the first and second lens elements.

In order to more readily locate the end of the first optical fiber that extends to the edge surface of the composite structure and to facilitate alignment with the first optical fiber, the composite structure of the present invention preferably includes an embedded microtube. The embedded microtube opens through the edge surface of the composite structure and an end portion of the first optical fiber preferably extends through the microtube to the edge surface. In order to further facilitate alignment of the first optical fiber, the microtube preferably defines an internal bore having the predetermined inner diameter that is no greater than 0.004 inches larger than the predetermined outer diameter of the first optical fiber. In addition, the microtube preferably extends at least one inch into the composite structure from the edge surface thereof.

The fiber optic connector is preferably assembled and is positioned adjacent the portion of the edge surface of the composite structure to which the first optical fiber extends such that the first and second optical fibers can be aligned. Once aligned, the first lens element is attached to the portion of the edge surface of the composite structure to which the first optical fiber extends and the remainder of the fiber optic connector, i.e., the fiber optic connector assembly, can then be removed. In order to optically connect the first and second optical fibers, the fiber optic connector assembly can thereafter be mounted to the first lens element by sliding the first end of the alignment tube at least partially over the first lens element. As such, optical communication is established between the first optical fiber embedded within the composite structure and the second optic fiber that extends into the second end of the alignment tube. Even in instances in which the fabrication of the composite structure has inadvertently failed to extend the embedded optical fibers to the edge surface of the resulting composite structure, the edge surface of the composite structure can be machined, such as by sawing or otherwise removing a portion of the original edge surface, to thereby expose an end portion of the first optical fiber. Thereafter, the first lens element can be attached and the fiber optic connector assembly can be mounted to the first lens element to establish optical communication between the first and second optical fibers as described above.

As a result, the fiber optic connector and associated method of the present invention permits optical communication to be established with an optical fiber embedded within a composite structure without requiring the optical fiber to extend beyond the edge surface of the optical fiber and risk being entangled with other optical fibers or electrical leads extending outwardly from the composite structure. In addition, the fiber optic connector assembly can be removed, if so desired, from the first lens element by slidably removing the alignment tube from the first lens element if the optical communication paths are reconfigured. The fiber optic connector and associated method of the present invention also facilitates alignment of the optical fiber embedded within the composite structure with a second optical fiber external to a composite structure to enhance optical communications therebetween.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
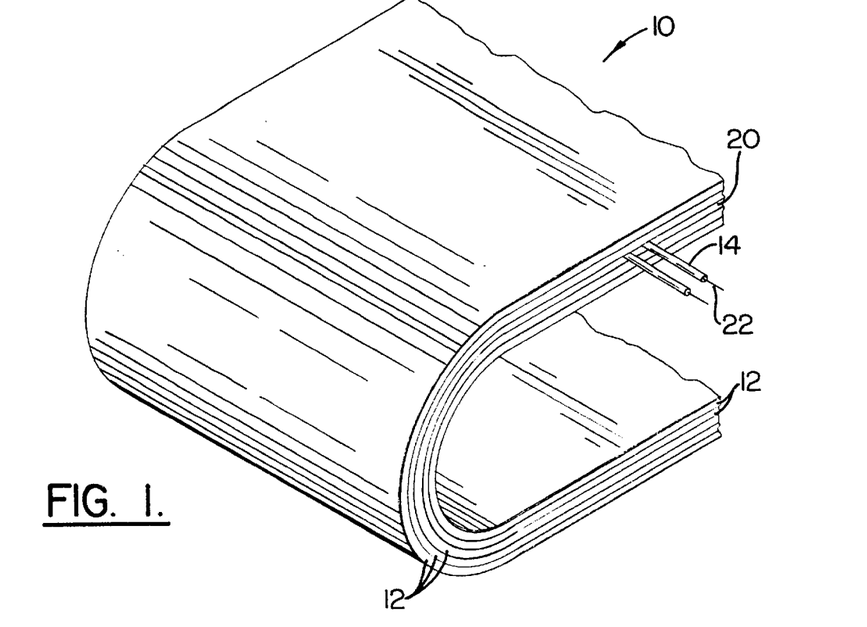
FIG. 1 is a perspective view of a composite structure illustrating a pair of optical fibers that extend through the edge surface of the composite structure.

Referring now to FIG. 1, a composite structure 10 according to the present invention is illustrated which includes a pair of first optical fibers 22 extending through the edge surface 20 of the composite structure. For example, the composite structure can be an automotive component or an aircraft component, such as a rudder, fairing or aileron. As shown, the composite structure is generally comprised of a plurality of plies 12 which are stacked and consolidated to thereby form a multi-ply laminate structure. The plies can be laid up and consolidated in any manner known to those skilled in the art, such as by a conventional autoclave curing process or by a fiber placement process. Alternatively, the composite structure can be formed by resin transfer molding (RTM) or by other composite curing processes such as, but not limited to, filament winding and pultrusion.

The plurality of plies 12 or the woven fiber intermediate structure can be formed of any of a variety of composite materials known to those skilled in the art. For example, even though the plies are typically formed of carbon fiber-reinforced composite materials, the composite structure 10 can be comprised of nonconductive or insulating plies, such as fiberglass plies, without departing from the spirit and scope of the present invention.

Figure 4:
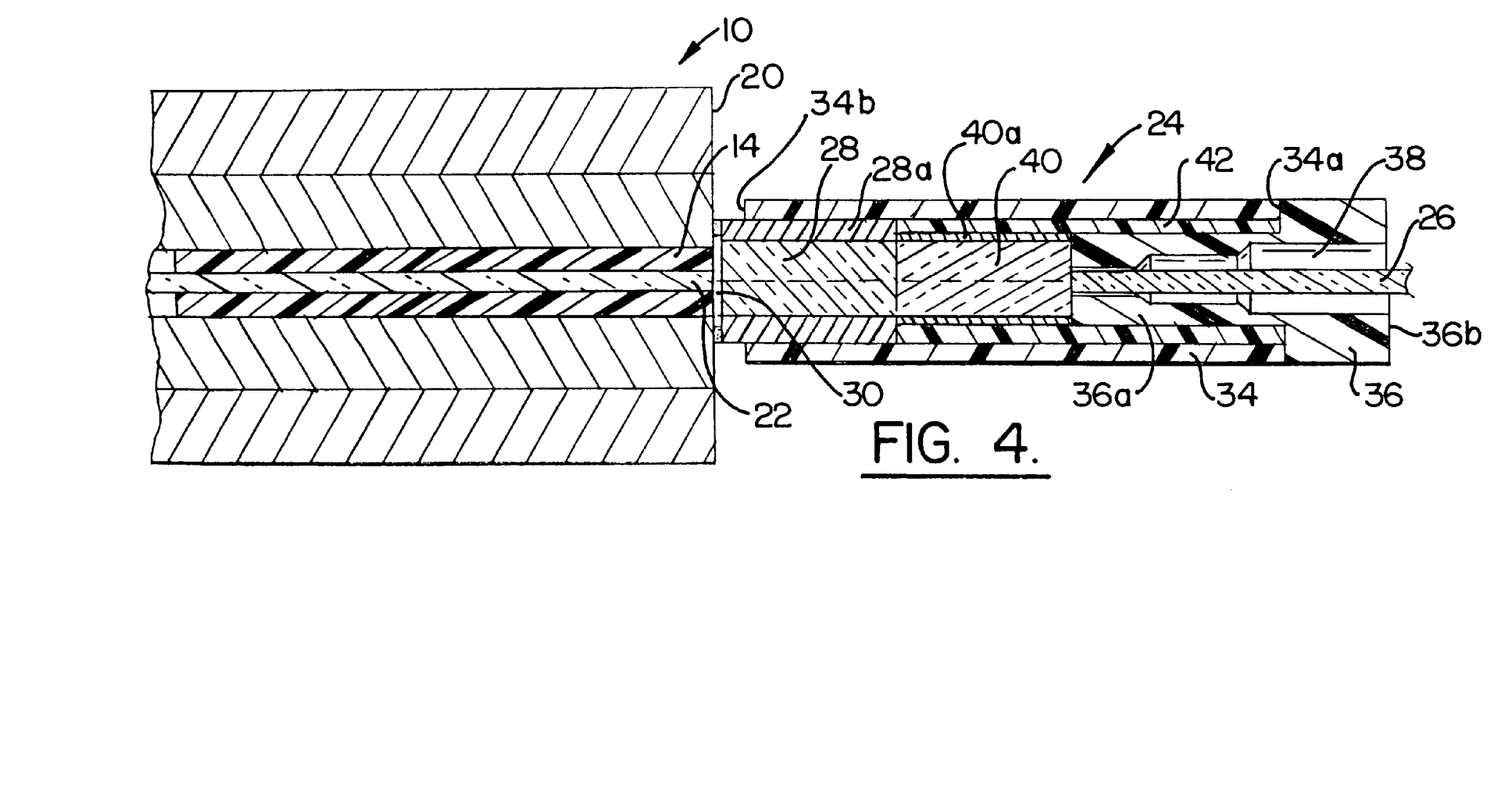
FIG. 4 is a cross-sectional view of the fiber optic connector of FIG. 3 following mounting of the fiber optic connector assembly to the first lens element that is attached to the portion of the edge surface of the composite structure to which the first optical fiber extends.

Although not necessary for the practice of the present invention, the composite structure 10 preferably includes one or more microtubes 14 that are embedded within the composite structure and extend through the edge surface 20 thereof as shown in FIG. 1 and, in more detail, in FIG. 4. As described in more detail in co-pending U.S. patent application Ser. No. 08/473,098, the microtube can be a hypodermic tube formed of a conducting material, such as stainless steel. The composite structure preferably includes at least as many microtubes as embedded optical fibers 22. As such, the end portion of each embedded optical fiber preferably extends through a respective microtube. The microtubes typically have a predetermined inner diameter that is sized to snugly receive a respective optical fiber. In one advantageous embodiment, the predetermined inner diameter of the microtube is sized to be no greater than 0.004 inches larger than the outer diameter of the respective optical fiber. In order to further secure the optical fiber within the microtube, the outer surface of the end portion of the optical fiber can be bonded, such as with an epoxy or other adhesive, to the inner surface of the microtube if so desired. As such, the optical fiber is typically coated with an adhesive and is then threaded into the microtube. As will be apparent to those skilled in the art, the adhesive should be sufficiently viscous to stick to the optical fiber, but should permit the optical fiber to be threaded into the microtube without shearing the optical fiber.

Although microtubes 14 provide a number of benefits as described below, microtubes are not necessary for the practice of the present invention. In fact, bare optical fiber 22 can extend to the edge surface 20 of the composite structure 10 or, alternatively, a metallized optical fiber can extend to the edge of the composite structure in order to provide many of the benefits of the microtube.

Figure 2:
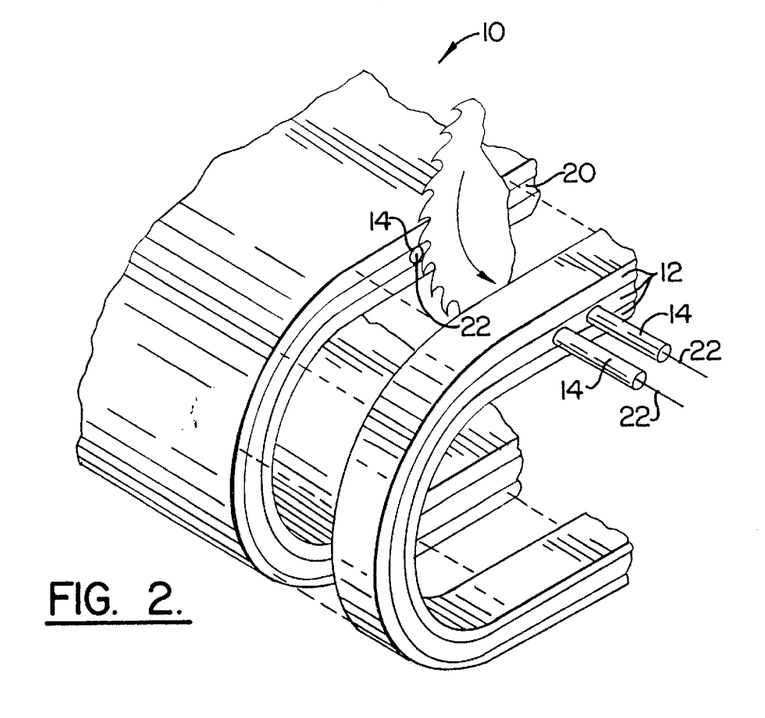
FIG. 2 is a perspective view of a composite structure in which the original edge surface is removed in order to expose the end portions of one or more optical fibers embedded within the composite structure.

If the microtubes 14 and/or the embedded optical fibers 22 extend beyond the edge surface 20 of the composite structure as shown in FIGS. 1 and 2, the microtubes and the optical fibers are preferably cut such that the microtubes and the optical fibers are flush with the edge surface. Thereafter, the end portions of the embedded optical fibers are optically polished as known to those skilled in the art.

Even if the microtubes 14 do not extend to or through the edge surface 20 of the composite structure 10 as shown in FIG. 1, the microtubes and, in turn, the optical fibers 22 extending through the microtubes can be accessed according to one advantageous embodiment of the method of the present invention. In this regard, the original edge surface of the composite structure can be machined in order to expose the microtubes and the optical fibers extending through the microtubes. In one embodiment, a water cooled diamond-tipped saw can be employed to cut or remove a portion of the edge surface of the composite structure, thereby exposing the microtubes and the optical fibers extending through the microtubes.

Once the edge surface 20 has been appropriately machined, the microtubes 14 and the embedded optical fibers 22 preferably extend to, but not beyond the edge surface such that the optical fibers do not become entangled with other optical fibers or electrical leads extending outwardly from the composite structure. Thereafter, the end portions of the embedded optical fibers are optically polished.

In addition to allowing the optical fibers 22 that are embedded within the composite structure 10 to be more readily located and accessed, the microtubes 14 facilitate the alignment and straightening of the optical fibers. In this regard, the microtubes are preferably embedded within the composite structure such that the microtubes are perpendicular to the surface of the composite structure, such as the edge surface 20 of the composite structure, through which the microtubes extend. In addition, the microtubes preferably extend at least one inch into the composite structure in the direction perpendicular to the edge surface, even after the edge surface has been machined such the microtubes are securely embedded therein. With respect to the orientation of the microtubes, the microtubes preferably are parallel to the orientation of the overlying ply and, more preferably, are parallel to the orientation of both the overlying and underlying plies. As described by co-pending U.S. patent application Ser. No. 08/473,098, the contents of which are incorporated in their entirety herein, the microtubes can also be connected to electrical wires that extend through the composite structure such that electrical contact can be established with these embedded wires via the respective microtubes.

Figures 3, 5, 6:
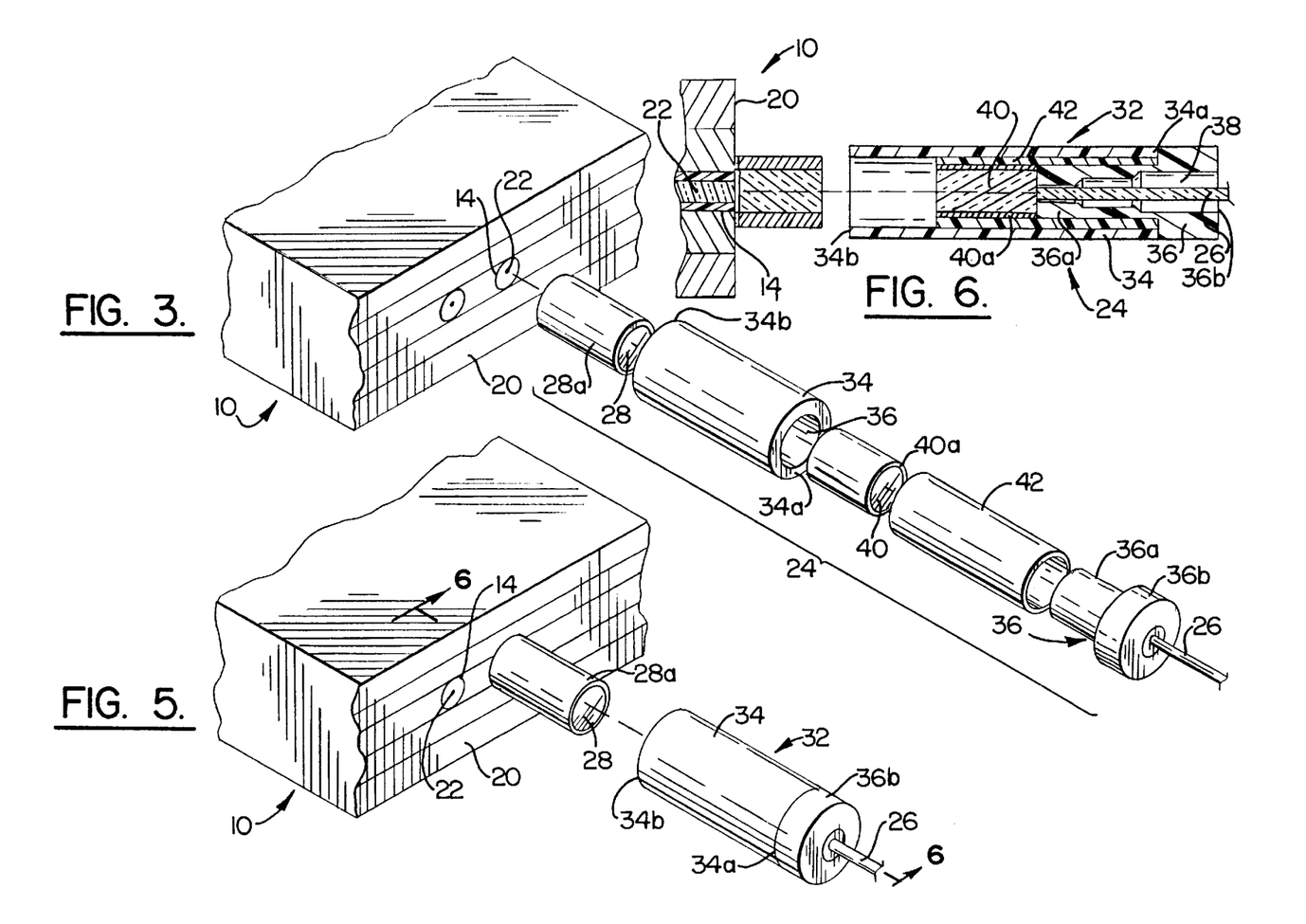
FIG. 3 is an exploded perspective view illustrating the various components of a fiber optic connector according to one advantageous embodiment of the present invention.
FIG. 5 is a partially assembled perspective view in which the first lens element has been attached to a portion of the edge surface of the composite structure to which a first optical fiber extends and in which the fiber optic connector assembly, including the alignment tube, the second lens element and the ferrule, has been assembled in preparation for mounting to the first lens element.
FIG. 6 is a cross-sectional view of the partially assembled fiber optic connector of FIG. 5.

The fiber optic connector 24 of the present invention is designed to optically interconnect a first optical fiber 22 embedded within the composite structure 10 and extending to the edge surface 20 thereof with a second optical fiber 26 external to the composite structure. As shown in FIG. 3, the fiber optic connector includes a first lens element 28 for attachment to the portion of the edge surface of the composite structure to which the first optical fiber extends. Once the fiber optic connector has been aligned with the first optical fiber as described below, the first lens element is preferably bonded to the edge surface of the composite structure with an optically transparent epoxy 30, such as an ultraviolet light curable epoxy.

The first lens element 28 is generally designed to collimate the optical signals transmitted to or from the first optical fiber 22 embedded within the composite structure 10. As such, the first element lens element of one advantageous element is a graded index (GRIN) lens. Typically, the first GRIN lens is a cylindrical GRIN lens that, in exemplary embodiment, has a diameter of 2 millimeters and a length of 4 millimeters. In addition, the first GRIN lens of one advantageous embodiment has a 0.25 pitch such that the lens can be placed in direct contact with an optical fiber.

In addition to the first lens element 28, the fiber optic connector 24 includes a fiber optic connector assembly 32. The fiber optic connector assembly includes an alignment tube 34, typically formed of plastic or a metal such as stainless steel, that defines a bore 36 extending lengthwise between opposed first and second ends. As shown in FIG. 3, the end portion of the second optical fiber 26 is inserted within the second end 34a of the alignment tube and is optically coupled to the first optical fiber embedded within the composite structure by means of the fiber optic connector. In this regard, the fiber optic connector assembly preferably includes a ferrule 36 defining a lengthwise extending bore 38 for receiving the end portion of the second optical fiber. As is known to those skilled in the art, a ferrule is generally formed of a plastic or metal, such as stainless steel, and defines a lengthwise extending bore that has a gradually stepped diameter for facilitating insertion of the end portion of the second optical fiber. The ferrule also generally has a stepped outer diameter having an elongate reduced diameter forward portion 36a and an enlarged rear portion 36b. As such, the reduced diameter forward portion of the ferrule is preferably inserted within the second end of the alignment tube until the enlarged rear portion abuts the alignment tube as shown in FIG. 4.

The fiber optic connector assembly 32 also preferably includes a second lens element 40 that is disposed within a medial portion of the bore 36 of the alignment tube 34. The second lens element is typically identical to the first lens element and, in one advantageous embodiment, is a cylindrical GRIN lens having a diameter of 2 millimeters, a length of 4 millimeters and a pitch of 0.25. As such, the second lens element collimates the optical signals received from the first lens element 28 and focuses the optical signals into the second optical fiber 26.

As shown in FIGS. 3 and 4, the fiber optic connector assembly 32 also preferably includes an inner tube 42, typically formed of a plastic or a metal such as stainless steel, within which the second lens element 40 and the reduced diameter forward portion 36a of the ferrule 36 are disposed. The inner tube is, in turn, inserted through the second end 34a of the alignment tube 34 and is disposed within the bore 36 of the alignment tube.

The fiber optic connector 24 is designed such that the second optical fiber 26 is aligned in a precise manner along the longitudinal axis of the alignment tube 34. In order to maintain the alignment of the second optical fiber along the longitudinal axis of the alignment tube, the second lens element 40 and the reduced diameter forward portion 36a of the ferrule 36 are preferably bonded within the inner tube 42, such as by means of an epoxy or other adhesive, and the inner tube is, in turn, bonded within the alignment tube, also by means of an epoxy or other adhesive. During this assembly process, care is taken to ensure that the second optical fiber is disposed along the longitudinal axis of the alignment tube. In order to facilitate bonding of the second lens element within the inner tube, the second lens element can include an outer metallic sheath 40a, typically formed of an alloy of nickel and gold.

The first lens element 28 can then be inserted into the first end 34b of the alignment tube 34 and the entire fiber optic connector 24 can be positioned adjacent the portion of the edge surface 20 of the composite structure 10 to which the first optical fiber 22 extends. In order to align the first lens element with the second lens element 40 and, in turn, with the second optical fiber 26, the first lens element and the alignment tube are preferably sized such that the outer diameter of the first lens element closely matches the inner diameter of the bore 36 of the alignment tube.

The fiber optic connector 24 is then aligned with the first optical fiber 22. For example, light of a known intensity can be introduced into the first optical fiber. By detecting the intensity of the light emerging from the second optical fiber 26 as a result of the light introduced into the first optical fiber, a measure of the alignment of the fiber optic connector with the first optical fiber is obtained. By moving the fiber optic connector relative to the first optical fiber and detecting the intensity of light emerging from the second optical fiber at each different position, the position of the fiber optic connector relative to the first optical fiber at which the maximum intensity of light is detected can be determined.

Since the fiber optic connector 24 is most closely aligned with the first optical fiber 22 in the position at which the maximum intensity of light is detected, the first lens element 28 is preferably attached to the edge surface 20 of the composite structure 10 at this position. Thereafter, the remainder of the fiber optic connector, i.e., the fiber optic connector assembly 32, can be removed from the first lens element so as to leave the first lens element attached to the edge surface of the composite structure as shown in FIGS. 5 and 6.

As shown in FIG. 4, the fiber optic connector assembly 32 can then be mounted or, more accurately, remounted to the first lens element 28 that has previously been attached to the portion of the edge surface 20 of the composite structure 10 to which the first optical fiber 22 extends. In order to mount the fiber optic connector assembly to the first lens element, the first end 34b of the alignment tube 34 is at least partially slid over the first lens element as shown in FIG. 4. In order to maintain the relative position of the fiber optic connector assembly with respect to the first lens element, the first lens element can be bonded, such as by means of an epoxy or other adhesive, within the first end of the alignment tube. In order to facilitate this bonding, the first lens element can also include an outer metallic sheath 28a that is typically formed of an alloy of nickel and gold. As such, optical communication can be established between the first optical fiber embedded within the composite structure and the second optical fiber external to the composite structure.

However, the fiber optic connector assembly 32 need not be bonded to the first lens element 28. If the first lens element is not bonded within the alignment tube 34, the fiber optic connector assembly can be subsequently removed from the first lens element and another fiber optic connector assembly can be mounted thereto. In this manner, the fiber optic communication paths can be reconfigured if so desired.

Although not illustrated, the second optical fiber can also be embedded in another composite structure so as extend to the edge surface thereof. In this embodiment, the second lens element can be attached to the portion of the edge surface of the other composite structure to which the second optical fiber extends. Upon positioning the pair of composite structures in an adjacent and aligned position, the first and second lens elements that are attached to the edge surfaces of the respective composite structures can be placed within an alignment tube, as described above, to establish optical communications between the first and second optical fibers.

The regions surrounding the first and second lens elements and the alignment tube can then be filled with an appropriate epoxy or resin to provide a relatively continuous surface.

As described above, the fiber optic connector 24 and associated method of the present invention permits optical communication to be established with an optical fiber 22 embedded within a composite structure 10 without requiring the optical fiber to extend beyond the edge surface 20 of the optical fiber and risk being entangled with other optical fibers or electrical leads. In addition, the fiber optic connector assembly 32 can be removed, if so desired, from the first lens element 28 by slidably removing the alignment tube 34 from the first lens element if the optical communication paths are reconfigured. The fiber optic connector and associated method of the present invention also facilitates alignment of the optical fiber embedded within the composite structure with a second optical fiber 26 external to a composite structure to enhance optical communications therebetween.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A fiber optic connector for optically interconnecting first and second optical fibers wherein the first optical fiber is embedded within a composite structure and extends to an edge surface thereof, the fiber optic connector comprising:
   a first lens element for attachment to a portion of the edge surface of the composite structure to which the first optical fiber extends;
   an alignment tube defining a bore extending lengthwise between opposed first and second ends;
   a ferrule defining a lengthwise extending bore for receiving an end portion of the second optical fiber, said ferrule being at least partially disposed within the second end of said alignment tube; and
   a second lens element disposed within a medial portion of the bore of said alignment tube, wherein said first and second lens elements are graded index (GRIN) lenses, and
   wherein said alignment tube is sized to receive said first lens element at least partially within the first end thereof such that optical communication is established between the first and second optical fibers.

2. A fiber optic connector for optically interconnecting first and second optical fibers wherein the first optical fiber is embedded within a composite structure and extends to an edge surface thereof, the fiber optic connector comprising:
   a first lens element for attachment to a portion of the edge surface of the composite structure to which the first optical fiber extends, wherein said first lens element comprises an outer metal sheath;
   an alignment tube defining a bore extending lengthwise between opposed first and second ends;
   a ferrule defining a lengthwise extending bore for receiving an end portion of the second optical fiber, said ferrule being at least partially disposed within the second end of said alignment tube; and
   a second lens element disposed within a medial portion of the bore of said alignment tube,
   wherein said alignment tube is sized to receive said first lens element at least partially within the first end thereof such that optical communication is established between the first and second optical fibers.

3. A composite structure for supporting optical communications comprising:
   a multi-ply laminate structure having an edge surface;
   a first optical fiber embedded within the laminate structure and extending to an edge surface thereof; and
   a fiber optic connector for optically interconnecting the first optical fiber with a second optical fiber, the fiber optic connector comprising:
   a first lens element attached to a portion of the edge surface of the laminate structure to which said first optical fiber extends;
   an alignment tube defining a bore extending lengthwise between opposed first and second ends; and
   a second optical fiber having an end portion disposed within the second end of said alignment tube,
   wherein said first lens element is received within the first end of said alignment tube such that optical communication is established between said first and second optical fibers.

4. A composite structure according to claim 3 further comprising a microtube embedded within said laminate structure and opening through the edge surface thereof, wherein an end portion of said first optical fiber extends through said microtube to the edge surface of said laminate structure.

5. A composite structure according to claim 4 wherein the first optical fiber has a predetermined outer diameter, and wherein said microtube defines an internal bore having a predetermined inner diameter that is no greater than 0.004 inches larger than the predetermined outer diameter of said first optical fiber.

6. A composite structure according to claim 4 wherein said microtube extends at least 1 inch into said laminate structure from the edge surface thereof.

7. A composite structure according to claim 3 wherein said fiber optic connector further comprises a second lens element disposed within a medial portion of the bore of said alignment tube.

8. A composite structure according to claim 7 wherein said fiber optic connector comprises a ferrule defining a lengthwise extending bore for receiving the end portion of said second optical fiber, said ferrule being at least partially disposed within the second end of said alignment tube.

9. A composite structure according to claim 8 wherein said fiber optic connector further comprises an inner tube in which said second lens element and at least a portion of said ferrule are disposed, said inner tube disposed within the bore of said alignment tube.

10. A composite structure according to claim 3 wherein said first lens element is a graded index (GRIN) lens.

11. A composite structure according to claim 3 wherein said first lens element comprises an outer metal sheath.

12. A method for optically interconnecting first and second optical fibers wherein the first optical fiber is embedded within a composite structure and extends to an edge surface thereof, the method comprising the steps of:
   attaching a first lens element to a portion of the edge surface of the composite structure to which the first optical fiber extends such that the first optical fiber embedded within the composite structure is in optical communication with the first lens element; and mounting a fiber optic connector assembly to the first lens element, wherein the fiber optic connector assembly comprises an alignment tube defining a bore extending lengthwise between opposed first and second ends, and wherein said mounting step comprises:

disposing an end portion of the second optical fiber within the second end of the alignment tube; and sliding the first end of the alignment tube at least partially over the first lens element such that optical communication is established between the first and second optical fibers.

13. A method according to claim 12 further comprising machining the edge surface of the composite structure to thereby expose an end portion of the first optical fiber.

14. A method according to claim 12 wherein said mounting step further comprises disposing a second lens element within a medial portion of the alignment tube prior to said sliding step.

15. A method according to claim 12 wherein said disposing step comprises the steps of:

disposing the end portion of the second optical fiber within a lengthwise extending bore of a ferrule; and inserting at least a portion of the ferrule within the second end of the alignment tube.

16. A method according to claim 12 further comprising a step of aligning the first optical fiber, the first lens element and the second optical fiber prior to said attaching step.

* * * * *

UNITED STATES PATENT AND TRADEMARK OFFICE
CERTIFICATE OF CORRECTION

PATENT NO. : 6,035,084
DATED : March 7, 2000
INVENTOR(S) : Haake et al.

It is certified that error appears in the above-identified patent and that said Letters Patent is hereby corrected as shown below:

On the title page, item [73] Assignee, "McDonnell" should read -- McDonnell--.

Signed and Sealed this

Sixth Day of February, 2001

Attest:

Q. TODD DICKINSON

*Attesting Officer*     *Director of Patents and Trademarks*